(12) United States Patent
Johansson

(10) Patent No.: US 8,012,552 B2
(45) Date of Patent: Sep. 6, 2011

(54) SMOKEABLE SAUSAGE CASING BASED ON POLYAMIDE

(75) Inventor: Tor Johansson, Mariehamn (FI)

(73) Assignee: Viskoteepak Belgium NV, Lommel (BE)

( * ) Notice: Subject to any disclaimer, the term of this patent is extended or adjusted under 35 U.S.C. 154(b) by 529 days.

(21) Appl. No.: 10/450,781

(22) PCT Filed: Jan. 10, 2002

(86) PCT No.: PCT/FI02/00021
§ 371 (c)(1),
(2), (4) Date: Jun. 18, 2003

(87) PCT Pub. No.: WO02/054878
PCT Pub. Date: Jul. 18, 2002

(65) Prior Publication Data
US 2004/0047951 A1    Mar. 11, 2004

(30) Foreign Application Priority Data
Jan. 11, 2001   (FI) ..................... 20010058

(51) Int. Cl.
*B32B 1/08* (2006.01)
*B32B 3/04* (2006.01)

(52) U.S. Cl. ............ 428/34.8; 428/34.1; 428/34.2; 428/35.7; 428/35.9; 428/36.9

(58) Field of Classification Search .......... 428/34.1, 428/34.2, 34.8, 35.7, 35.9, 36.9
See application file for complete search history.

(56) References Cited

U.S. PATENT DOCUMENTS

| | | | |
|---|---|---|---|
| 4,032,550 A | 6/1977 | White et al. | |
| 4,486,507 A | 12/1984 | Schumacher | |
| 4,698,186 A | 10/1987 | Jeromin et al. | |
| 5,532,392 A | 7/1996 | Gheorghiu | |
| 5,773,059 A | 6/1998 | Delius et al. | |
| 5,888,597 A * | 3/1999 | Frey et al. ............... | 428/35.5 |
| 5,936,044 A | 8/1999 | Melot et al. | |
| 5,959,055 A | 9/1999 | Le Blevec et al. | |
| 6,712,867 B1 | 3/2004 | Boocock | |
| 6,878,837 B2 | 4/2005 | Bournay et al. | |
| 2003/0152725 A1* | 8/2003 | Delius ................... | 428/35.7 |

FOREIGN PATENT DOCUMENTS

| | | |
|---|---|---|
| EP | 0 006 528 A1 | 1/1980 |
| EP | 0 065 278 A3 | 11/1982 |
| EP | 0 476 963 A3 | 3/1992 |
| EP | 0 613 919 A1 | 9/1994 |
| EP | 0 797 918 A1 | 10/1997 |
| EP | 0 848 019 A1 | 6/1998 |
| FI | 963042 A | 8/1996 |
| WO | WO 98/19551 A1 | 5/1998 |
| WO | WO 98/26004 A1 | 6/1998 |
| WO | WO 00/75220 A1 | 12/2000 |
| WO | WO-0075220 * | 12/2000 |
| WO | WO 01/12581 A1 | 2/2001 |
| WO | WO 03/040081 A1 | 5/2003 |
| WO | WO 2004/048311 A1 | 6/2004 |

OTHER PUBLICATIONS

Suppes et al., "Transesterification of soybean oil with zeolite and metal catalysts", Elsevier B.V., pp. 1-14, Apr. 9, 2003.
International Search Report—PCT/US2006/022665.
World Patent index, WPI, Derwent, EPOQUE, JP 63063784, 1988-11667.

* cited by examiner

*Primary Examiner* — Marc A Patterson
(74) *Attorney, Agent, or Firm* — Birch, Stewart, Kolasch & Birch, LLP

(57) ABSTRACT

The invention relates to smokable sausage casings which are based on polyamide and polymers containing polyamide blocks and polyether blocks. The said smokable, heat-shrinkable tubular sausage casings are particularly suitable for the manufacture of cooked meat sausages, scalded-emulsion sausages, cooked or rapidly fermented sausages containing fat and smoked ham. The smokable sausage casing comprises 15-85 wt % of a polyamide (i) or a combination of polyamides (i) and 15-85 wt % of a polymer (ii) containing polyamide blocks and polyether blocks or a combination of polymers (ii).

13 Claims, No Drawings

SMOKEABLE SAUSAGE CASING BASED ON POLYAMIDE

The invention relates to smokable sausage casings which are based on polyamide and polymers containing polyamide blocks and polyether blocks. The said smoke-able, heat-shrinkable tubular sausage casings are particularly suitable for the manufacture of cooked meat sausages, scalded-emulsion sausages, fat-containing cooked or fermented sausages and smoked ham.

Cooked meat sausages are conventionally manufactured using edible or non-edible collagen casings, natural casings formed from natural materials like animal intestines, fibrous or cellulose casings or oriented or unoriented plastic casings comprising one or several layers. Smoke penetrates fibrous casings and cellulose casings and thus they are widely used in the manufacture of cooked meat sausages. However, the manufacturing process for fibrous casings and cellulose casings involves the use of the viscous process which causes undesirable emissions of carbon disulphide and hydrogen sulphide to the atmosphere. This is a major environmental problem and unacceptable nowadays in many countries. Fibrous casings manufactured from regenerated cellulose are often difficult to peel from sausages without braking the casing. Because of the high permeability of fibrous casings significant weight loss of sausages takes place during the manufacture and especially during the cooling process.

Cooked or fermented sausages containing substantial amounts of fat are manufactured in cellophane casings and in fibrous casings, which are easily smokable. However, fat tends to leak out through the casing and clips or seams thus making the appearance and handling of such sausages unclean. Also such sausages may develop black spots on the casing, caused probably by sulphur compounds in the casing, resulting in that such sausages cannot be sold to consumers.

In the manufacturing process sausage casings are usually soaked before filling with sausage mix and mould-preventing agents are required to prevent potential growth of moulds in the humid casings. All of natural casings and most of synthetic casings according to the state of the art are not heat-sealable and thus clips or other sealing means have to be used.

There is also a potential risk of BSE when using sausage casing formed from natural materials like bovine intestines and thus they are not so popular any more as sausage casings. Plastic casings are generally regarded as casings which are not smokable because they are poorly or not at all smoke permeable and thus they are not suitable for the manufacture of sausages which are smoked.

Several plastic films for packaging of food products are known and these films are usually based on poly(ethylene terephthalate) (PET), poly(vinylidene chloride) (PVDC) and polyamide (PA), also known as nylon. Axially stretched PET casings are usually not suitable for cooked meat sausages or scalded-emulsion sausages because they are poorly extendable and they shrink only very little.

PVDC casings are more extensible but, however, they are more likely to loose their shape after filling. Special equipment is required for the extrusion of PVDC, and because chlorine containing PVDC casings are brittle, they usually contain as plasticizers phthalates which are considered potentially hazardous substances to health. Additionally, as PVDC casings contain chlorine, their disposal is problematic and in many countries the use of PVDC in food packaging is forbidden nowadays.

Polyamide casings are more extensible, they shrink to a greater extent and they are more suitable for cooked meat sausages, however they are not considered smokable. Several polyamide based sausage casings are known in the art, single-layer sausage casings and also multi-layer casings.

U.S. Pat. No. 5,773,059 discloses a polyamide based sausage casing of a polymer blend which comprises:
a) polyamide 6 (nylon 6),
b) 5-50 wt %, based on the total weight of all polymers in the layer of
  b1) aliphatic copolyamide containing units of the formulae —NH—$(CH_2)_5$—CO and —NH—$(CH_2)_m$—CO, where m is an integer from 7-11, or
  b2) an aliphatic copolyamide containing units of the formulae —NH—$(CH_2)_5$—CO—, —NH—$(CH_2)_n$—NH— and —CO—$(CH_2)_o$—CO where n is an integer from 6-12 and o is an integer from 7-10, or both b1) and b2), and
c) 0-20 wt % of an amorphous copolyamide containing hexamethylene diamine, and at least one of terephthalic acid and isophthalic acid units, and
d) 0-20 wt % of a polyolefin modified by carboxylic groups.

This casing is a blend of polyamides and it may optionally contain a coextruded polyolefin layer. Polyolefin casings are generally not regarded as smokable. The casings according to this publication are particularly suitable for the manufacture of scalded-emulsions sausages and cooked meat sausages by mechanical and especially by manual filling, but they have poor smoke permeability.

EP 476,963 discloses films composed of a mixture (i) of a copolymer with polyamide blocks and polyether blocks which are hydrophilic, (ii) of a hydrophobic polymer which can be the preceding copolymer but with hydrophobic polyether blocks or a polyamide or a polyurethane, and (iii) optionally of a compatibilizing agent. The film is permeable to water vapour and impermeable to liquid water and has a low water uptake.

EP 0797918 is concerned with a smokable casing comprising polyamide and polyolefin. The casings according to this publication comprises a heat-shrinkable tubular laminate including at least one layer of a polyamide resin and at least one layer of a modified polyolefin resin. Said casings require very long smoking processes which are not suitable for example for cooked meat sausages on an industrial scale.

WO 98/19551 discloses polyamide-based sausage skins which can be filled manually without or with minor filling pressure and they are suitable for cooked sausages. Said sausage skins are biaxially stretched and thermofixed, tubular seamless casings with one or more layers, wherein at least one of the layers comprise a block copolymer according to any of the following formulas (I)-(III), with hard aliphatic polyamide blocks and soft aliphatic polyether blocks:

$$E_a\text{-}(NH\text{—}[CH_2]_x\text{—}CO)_m\text{—}X_a\text{-}(A\text{-}O)_n\text{-}A\text{-}X_a\text{—}(CO\text{—}[CH_2]_x\text{—}NH)_m\text{-}E_a \quad (I)$$

wherein A is an alkanediyl residue of formula —$CH_2$—$CH_2$— (=ethane-1,2-diyl),
  $CH_2$—$CH(CH_3)$— (=propane-1,2-diyl) or
  $(CH_2)_4$— (=butane-1,4-diyl),
$X_a$ is O— or —NH—,
$E_a$ is H, $(C_2\text{-}C_8)$ alkanoyl, benzoyl or phenylacetyl,
  CO—N($[CH_2]_{x-1}$—$CH_3$)—CO—$(C_1\text{-}C_4)$ alkyl,
  CO—N($[CH_2]_{x-1}$—$CH_3$)—CO—$C_6H_5$ or
  CO—N($[CH_2]_{x-1}$—$CH_3$)—CO—$CH_2$—$C_6H_5$,
x is an integer from 5 to 11, m is an integer from 30 to 200 and n is an integer from 4 to 60,

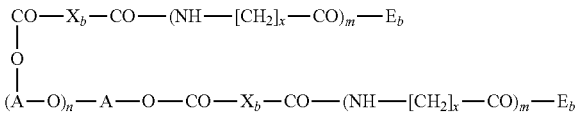
(II)

wherein $X_b$ is an alkanediyl residue of formula —$[CH_2]_z$—, where z is an integer from 4 to 10,
meta- or para-phenylene,
—NH—($C_1$-$C_6$) alkyl-NH—,
—NH—$C_6H_3$—($CH_3$)—NH—
) N—$[CH_2]_{x-1}$—$CH_3$,   —$[CH_2]_z$—CO—N($[CH_2]_{x-1}$—$CH_3$)— or
—$C_6H_4$—CO—N($[CH_2]_{x-1}$—$CH_3$)—, where $C_6H_4$ represents meta- or para-phenylene
$E_b$ is —OH, —O—($C_1$-$C_7$) alkyl, —O-phenyl or

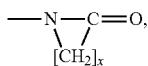

and
A, m and n have the above meanings;

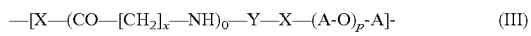  (III)

wherein Y is —CO—, —CO—$[CH_2]_z$—CO—, —CO—$C_6H_4$—CO— or
where $C_6H_4$ represents meta- or para-phenylene, or
CO—N($[CH_2]_{x-1}$—$CH_3$)—CO—,
CO—N($[CH_2]_{x-1}$—$CH_3$)—CO—$[CH_2]_z$—CO—N($[CH_2]_{x-1}$—$CH_3$)—CO—,
CO—N($[CH_2]_{x-1}$—$CH_3$)—CO—$C_6H_4$—CO—N($[CH_2]_{x-1}$—$CH_3$)—CO—,
where $C_6H_4$ has the given meaning, o is an integer from 10 to 150, p is an integer from 4 to 100 and A, x and z have the above given meanings.

These sausage skins are not designed for smoked sausages as the thickness of the casings is high and polymers of hydrophobic nature are used. Additionally, the moisture vapour transmission rate of said sausage skins is very low.

Traditionally, only sausages manufactured into collagen casings, cellulose casings or fibrous casings of regenerated cellulose or sausages manufactured in casings made from other natural materials are smokable. Plastic casings are generally not used for sausages which are smoked as they are not considered smokable. Based on the above it can be seen that there exists a need for smokable sausage casings for the manufacture of cooked meat sausages, scalded-emulsion sausages, fat-containing cooked or fermented sausages and smoked ham, which manufacture takes place particularly on an industrial scale.

An object of the present invention is to provide a smokable sausage casing for cooked meat sausages, scalded-emulsion sausages, fat-containing cooked or fermented sausages and smoked ham. Another object of the invention is to provide a method for the manufacture of cooked meat sausages, scalded-emulsion sausages, fat-containing cooked or fermented sausages and smoked ham, in smokable sausage casings.

The characteristic features of the smokable sausage casings for cooked meat sausages, scalded-emulsion sausages, fat-containing cooked or fermented sausages and smoked ham and of the method for the manufacture of cooked meat sausages, scalded-emulsion sausages, fat-containing cooked or fermented sausages and smoked ham are provided in the claims.

Surprisingly it has been found that the disadvantages and problems related to the casings and manufacturing methods according to the state of the art can be avoided or at least significantly decreased with the smokable casing according to the invention. Said smokable sausage casings can be manufactured from a specific combination of at least one polyamide (i) and at least one polymer (ii) containing polyamide blocks and polyether blocks. It has been noticed that the smokeability of the casing is directly proportional to the moisture vapour transmission rate (MVTR) of the casing.

Suitable polyamides (i) are selected from the group comprising:
PA6=H—(NH—$(CH_2)_5$—CO)$_n$—OH (nylon-6), homopolymer or copolymer,
PA66=H—(NH—$(CH_2)_6$—HN—CO—$(CH_2)_4$—CO)$_n$—OH (nylon 66),
PA6.12=H—(NH—$(CH_2)_6$—HN—CO—$(CH_2)_{10}$—CO)$_n$—OH (nylon 612),
PA6/66=H—(NH—$(CH_2)_5$—CO)—OH+H—(NH—$(CH_2)_6$—HN—CO—$(CH_2)_4$—CO)—OH (in random order) (nylon 6/66),
PA6/12=H—NH—$(CH_2)_5$—CO)—OH+H—(NH—$(CH_2)_{11}$—CO)—OH (in random order) (nylon 6/12),
PA6/69=H—(NH—$(CH_2)_5$—CO)—OH+H—(NH—$(CH_2)_6$—HN—CO—$(CH_2)_7$—CO)—OH (in random order) (nylon 6/69), and
MXDA containing polyamides, partially aromatic polyamides and mixtures of above mentioned polyamides.

Preferable ones are PA 6/66, PA6 or mixtures of PA 6/66 and PA6.

Suitable polymers (ii) containing polyamide blocks and polyether blocks are selected from the group comprising thermoplastic polymers having polyether chains and it being possible for these chains to be side chains (copolymer B) or to be blocks (or sequences) in the main chain (copolymer A) or to be present as side chains or as blocks.

Mention may be made, as an example of a polymer having polyether side chains, of copolymers of ethylene and of a polyalkylene glycol (meth)acrylate, such as those disclosed in EP 848,019, the contents of which are incorporated in the present application.

Mention may be made, as an example of a polymer A having polyether blocks, of the copolymer (A) of WO 98/26004 which means a block copolymer in which polyoxyalkylene chains and other polymer chains are linked together, or a polymer in which polyoxyalkylene chains are connected together via coupling regions.

The polyether blocks comprise alkylene oxide units which can be chosen from ethylene oxide, propylene oxide and —$CH_2$—$CH_2$—$CH_2$—$CH_2$—O—. The water vapour permeability increases with the proportion of polyether and with its nature. The greater the amount of polyethylene glycol, the greater the permeability to water vapour.

The polyether blocks can represent 5 to 85% by weight of (A). The polyether blocks can comprise other units than ethylene oxide units, such as, for example, propylene oxide or polytetrahydrofuran, which results in polytetramethylene glycol linkages. It is also possible simultaneously to use PEG blocks, that is to say those composed of ethylene oxide units, PPG blocks, that is to say those composed of propylene oxide units, and PTMG blocks, that is to say those composed of tetramethylene glycol units, also known as polytetrahydrofuran blocks (PTHF). Use is preferably made of PEG blocks or of blocks obtained by oxyethylation of bisphenols, such as, for example, bisphenol A. The latter products are disclosed in EP 613,919.

Polyether blocks comprised different units, such as units derived from ethylene glycol (—OC$_2$H$_4$—), from propylene glycol

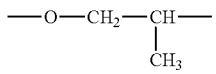

or from tetramethylene glycol (—O—(CH$_2$)$_4$—) are also suitable ones.

The amount of polyether blocks in (A) is preferably from 10 to 50% by weight of (B). Advantageously, (A) is a copolymer with polyamide blocks and polyether blocks.

Polymers with polyamide blocks and polyether blocks result from the copolycondensation of polyamide sequences comprising reactive ends with polyether sequences comprising reactive ends, such as, inter alia:

1) polyamide sequences comprising diamine chain ends with polyoxyalkylene sequences comprising dicarboxylic chain ends,
2) polyamide sequences comprising dicarboxylic chain ends with polyoxyalkylene sequences comprising diamine chain ends obtained by cyanoethylation and hydrogenation of α,ω-dihydroxylated aliphatic polyoxyalkylene sequences, known as polyetherdiols,
3) polyamide sequences comprising dicarboxylic chain ends with polyetherdiols, the products obtained being, in this specific case, polyetheresteramides.

Polyamide sequences comprising dicarboxylic chain ends originate, for example, from the condensation of α,ω-aminocarboxylic acids, of lactams or of dicarboxylic acids and diamines in the presence of a chain-limiting dicarboxylic acid. The polyamide blocks are made of polyamide-6 or polyamide-12 and preferably of polyamide-6.

The number-average molar mass of the polyamide sequences is between 300 and 15,000 and preferably between 600 and 5000. The mass of the polyether sequences is between 100 and 6000 and preferably between 200 and 3000.

The polyamide blocks and polyether blocks can also comprise randomly distributed units. These polymers can be prepared by the simultaneous reaction of the polyether and of the precursors of the polyamide blocks.

For example, polyetherdiol, a lactam (or an α,ω-amino acid) and a chain-limiting diacid can be reacted in the presence of a small amount of water. A polymer is obtained which has essentially polyether blocks and polyamide blocks of very variable length but also the various reactants which have reacted randomly, which are statistically distributed along the polymer chain.

These polymers with polyamide blocks and polyether blocks, whether they originate from the copolycondensation of polyamide and polyether sequences prepared beforehand or from a one-stage reaction, exhibit, for example, Shore D hardnesses which can be between 20 and 75 and advantageously between 30 and 70 and an intrinsic viscosity between 0.8 and 2.5, measured in meta-cresol at 25° C. for a starting concentration of 0.8 g/100 ml.

Whether the polyether blocks derive from polyethylene glycol, polypropylene glycol or polytetramethylene glycol, they are either used as is and copolycondensed with polyamide blocks comprising carboxylic ends or they are aminated, in order to be converted into polyetherdiamines, and condensed with polyamide blocks comprising carboxylic ends. They can also be mixed with polyamide precursors and a chain-limiting agent in order to form polymers with polyamide blocks and polyether blocks having statistically distributed units.

The polyether is preferably polyethylene glycol (PEG).

Whether the polyether blocks are in the chain of the polymer with polyamide blocks and polyether blocks in the form of diols or of diamines, they are known for simplicity as PEG blocks.

The polymer (ii) with polyamide blocks and polyether blocks preferably comprises a single type of polyamide block and a single type of polyether block. Use is made of polymers with PEG blocks having a greater permeability to water vapour.

The polymer with polyamide blocks and polyether blocks is advantageously such that the polyamide is the major constituent by weight, that is to say that the amount of polyamide which is in the form of blocks and that which is optionally statistically distributed in the chain represents 40% by weight or more of the polymer with polyamide blocks and polyether blocks. The amount of polyamide and the amount of polyether are advantageously in the ratio (polyamide/polyether) 1/1 to 3/1.

A suitable polymer (ii) is a hydrophilic polymer having polyether chains and with a moisture vapour transmission rate (MVTR) of more than 100 g/m$^2$/24 hours, preferably 250-20.000 g/m$^2$/24 hours when measured using the ASTM E96 BW method. Also combinations of such polymers (ii) may be used.

The smokable sausage casing according to the invention comprises 15-85 wt %, preferably 50-70 wt % of the polyamide (i) or a combination of polyamides (i) and 15-85 wt %, preferably 30-50 wt % of the hydrophilic polymer (ii) with polyamide blocks and polyether blocks, preferably polyethylene glycol (PEG) blocks, or a combination of hydrophilic polymers (ii) with polyamide blocks and polyether blocks. Preferably the smokable sausage casing comprises a polyamide (i) selected from PA6, PA6/66 and mixtures thereof and a polymer (ii) with polyamide PA6 blocks and polyether PEG blocks, which polymer (ii) has a moisture vapour transmission rate (MVTR) of more than 100 g/m$^2$/24 hours, preferably 250-20.000 g/m$^2$/24 hours (ASTM E96 BW). The obtained sausage casing is preferably biaxially stretch-oriented and it has a moisture vapour transmission rate (MVTR) of more than 200 g/m$^2$/24 hours, preferably more than 400 g/m$^2$/24 hours when measured using the ASTM E96 BW method. The ratio of orientation is then 6-12, preferably 7-9 (transverse orientation×length).

Polyamide (i) and polymer (ii) are mixed and converted into a homogeneous melt which is extruded through a ring die and formed into a seamless tube which is then stretched in longitudinal and transverse directions i.e. biaxially stretch-oriented. Mixing and melting can be performed in separate mixing extruders. The casing comprises one or more coextruded layers which may comprise same or different polymers.

The manufacturing process of the sausage casings according to the invention is simple and it presents no environmental problems related to emissions of volatile organic compounds or undesirable odours. The polymer leftovers from the manufacturing process can be recycled to the process and practically no waste is formed. Cooked meat sausages, scalded-emulsion sausages and fat-containing cooked or rapidly fermented sausages requiring smokeability can easily be manufactured into the casings according to the invention. The smoking may be performed using natural smoke or liquid smoke. The casing can be biaxially stretch-oriented or unoriented with one or more layers, preferably it is biaxially stretch-oriented. It may be in a tubular form which is sealable with metal clips or other known method or it can be heat-sealed, or it can be in flat film that is sealable to a desired from.

In the manufacturing process sausage mix or ham is stuffed into the casings and the sausages or ham are smoked and cooked using a program characteristic to smoked sausages or smoked ham. The smoking process may be a hot smoke process and natural smoke or liquid smoke may be used.

The finished sausage casing shows a shrinkage of 5-25% in cross direction and of 5-25% in length direction in water at 78° C. A thickness of the stretched and thermoset sausage casing is 10-70 μm and preferably 15-45 μm. The pressure resistance of the casing according to the invention, with a thickness of 15 μm is more than 40 kPa. The sausage casing according to the invention is preferably biaxially stretch oriented and thermoset, it also may be shirred and it is peelable by machines. The casing requires no soaking step before stuffing and no mold pre-venting agents are needed. Anti-block agents and slip agents known in the art may be used if desired.

The obtained casing is surprisingly rapidly smokable and the smoked product has to taste and appearance like a sausage manufactured in conventional smokable casings. The required smoking time is short thus making said sausage casings particularly suitable for the manufacture of cooked meat sausages, scalded-emulsion meat products and cooked or rapidly fermented sausages containing fat, on an industrial scale. Very thin casings can be manufactured still retaining good pressure resistance, dimension stability and good cooking durability. Further, weight loss of sausages manufactured in casings according to the invention is significantly lower than the one when using natural or cellulose based casings.

As the casings according to the invention are also heat-sealable, the manufacture of said sausages is more simple and economic. They are fat proof, no fat leaks through the casings which makes them particularly suitable for a lot of fat-containing cooked or fermented sausages and further, no black spots are formed on the casing.

The invention is further illustrated in the following with examples to which the scope of invention is not limited.

EXAMPLE 1

Smokeability-Properties of Three Different Plastic Casings

Both smoke flavour and colour are formed by combined effect of many agents/substances and by their reactions with the product itself. Smoke flavour and colour do not necessarily form by influence of the same factors, and besides certain factors have also synergistic properties.

Smoking provides the following—conceived as positive—effects: flavouring, colouring, preserving by antioxidative and antimicrobial action and formation of a secondary skin. (Tóth, L. & Potthast, K. 1984. Chemical aspects of the smoking of meat and meat products. In: "*Advances in Food Research, vol. 29*". Academic Press, Inc, Orlando, Fla. 1984. 87-150.) Curing smoke consists of a dispersed phase of solid and liquid particles as well as a gaseous phase. The size of liquid particles varies between 0.2-0.4 μm. (Bøgh-Sørensen, L., Højmark Jensen, J., Jul, M. 1981. Konserveringsteknik 2. Dsr Forlag, Kobenhavn.)

Here smokeability means the smoke-permeability properties of the casing and term smokiness aroma, smoky taste and color of the final, peeled product. The smokeability-properties of three different plastic casings according to the invention were compared with a nylon casing and cellophane casing.

Samples 3 different plastic casings were examined. As reference samples a commercial nylon casing (Grilon F 47) and a commercial cellophane casing were used. Compositions of the casings used are provided in the following Table 1:

TABLE 1

| Casing nr | Polyamide (i)/wt % | Polymer (ii)/wt % |
| --- | --- | --- |
| 3 | Grilon CR 9 HV/75% (nylon 6.12) | Pebax MH 1657/25% (PA blocks + PEG blocks) |
| 10 | Ultramid C 4/70% (nylon 6/66) | Pebax MH 1657/30% |
| 11 | Ultramid C 4/70% (nylon 6/66) | Pebax MV 1074/30% (PA blocks + PEG blocks) |

Processing of the Sausages

Four plastic films (commercial nylon casing and casings 3, 10 and 11) were extruded in tubular form and biaxially oriented to a total orientation ratio of 9.0 and thermoset. The diameter of the thermoset tubular casing was 22 mm and the thickness of the nylon casing was 20 μm, and of casings 3, 10 and 11 16 μm. The sausage mix was stuffed into the casings and the sausages were smoked and cooked by the program characteristic to smoked sausages. The smoking process was a hot smoke processing (50-85° C.) (Tóth & Potthast, 1984). After the cooking and cooling the sausages were vacuum-packed and cold-storaged at 3.5° C.

Methods of Analysis

Sensory Evaluation

The sensory evaluation of the products was carried out after two and after three days from processing. The panel evaluated smokiness (smoke's intensity of aroma, taste and colour) from the peeled sausages. The sausages were peeled for the evaluation and cut into pieces. The temperature of the samples was about 20° C. and they were served in random order (coded) to the evaluators.

The evaluation method used was a graphic method (estimation of intensity), in which the evaluators marked their opinion of the product's intensity of smoky aroma or taste or color on the 150 mm line segment. The line segment was anchored from it's ends by the terms that described the studied property (aroma: no smoky aroma—intense smoky aroma; taste: no smoky taste—intense smoky taste; color: light-dark).

There were individual samples for aroma, taste and colour evaluation. The evaluations of aroma and taste were accomplished in red light in order to prevent possible color differences between separate samples to affect the evaluation.

Differences between the samples were examined by the analysis of variance (LSD-method). Correlation between individual factors was examined.

Results

The results of differences between samples (casings) regarding the properties were examined and average values were calculated and shown in Table 2.

TABLE 2

The results of sensory evaluation. The average values given for samples; two evaluation times.

| | Average value | | | | |
|---|---|---|---|---|---|
| Sample | Nylon | 10 | 11 | 3 | Cellophane |
| Aroma | 24.5 | 52.8 | 60.3 | 52.9 | 101.0 |
| Taste | 21.0 | 47.6 | 66.3 | 50.8 | 92.4 |
| Colour | 17.5 | 75.7 | 63.6 | 49.3 | 119.1 |

The results show that the casings examined were significantly more smoke-permeable than nylon casing and they fulfilled well requirements set for a smokable casing

EXAMPLE 2

Industrial Manufacturing Process for Cooked Sausages

Standard cooked sausages stuffed in a casing with a thickness of 30 μm and containing 70 wt % of Ube PA 5034 FDX 33 (PA 6/66) and 30 wt % of Pebax MH 1657 (PA6+PEG) were cooked and smoked according to following programs A and B which are suitable for the manufacture of sausages on an industrial scale.

Program A/Slightly smoked cooked sausage

| Test | Temperature/ °C. | Relative Humidity/% | Time/ min | Step |
|---|---|---|---|---|
| 1. | 60 | 98 | 10 | Formation of colour |
| 2. | 67 | 0 | 6 | Drying |
| 3. | 70 | 45 | 2 | Smoking |
| 4. | 72 | 100 | 20 | Cooking |
| 5. | 77 | 100 | 38* | Cooking |

*= or until inner temperature is 72° C.

Program B/Cooked sausage with a clear "smoked" aroma

| Test | Temperature/ °C. | Relative Humidity/% | Time/ min | Step |
|---|---|---|---|---|
| 1. | 60 | 98 | 10 | Formation of colour |
| 2. | 65 | 0 | 8 | Drying |
| 3. | 68 | 60 | 6 | Smoking |
| 4. | 72 | 100 | 20 | Cooking |
| 5. | 77 | 100 | 33* | Cooking |

*= or until inner temperature is 72° C.

No changes in the weight of sausages tested in programs A or B were noticed. Suitable relative humidity during the smoking step varied between 45-60% when short smoking times of 2-6 min were used. Clear formation of desired colour could be noticed and the aroma and taste were acceptable.

The invention claimed is:
1. A smokable biaxially stretch oriented sausage casing, comprising:
15-85 wt % of a polyamide (i) selected from the group consisting of:
PA6=H—(NH—(CH$_2$)$_5$—CO)$_n$—OH,
PA6/66=H—(NH—(CH$_2$)$_5$—CO)—OH+H—(NH—(CH$_2$)$_6$—HN—CO—(CH$_2$)$_4$—CO)—OH (in random order),
and a combination of polyamides PA6 and PA6/66;
15-85 wt % of a hydrophilic polymer (ii) containing polyamide PA6 blocks and polyethyleneglycol (PEG) blocks or a combination of hydrophilic polymers (ii),
wherein the number-average molar mass of the polyamide PA6 blocks is between 300 and 15,000 and the mass of the polyethyleneglycol (PEG) blocks is between 100 and 6,000, and the ratio of PA6 blocks and PEG blocks in the hydrophilic polymer (ii) is in the range from 1/1 to 3/1,
wherein the casing has a moisture vapour transmission rate (MVTR) of more than 400 g/m$^2$/24 hours when measured using the ASTM E96 BW method, and the thickness of the casing is 15-45 μm, and
wherein the casing comprises one layer.
2. The smokable sausage casing according to claim 1, wherein the casing comprises 50-70 wt % of a polyamide (i) or a combination of polyamides (i) and 30-50 wt % of a hydrophilic polymer (ii) or a combination of hydrophilic polymers (ii).
3. The smokable sausage casing according to claim 1 or 2, wherein the hydrophilic polymer (ii) has a moisture vapour transmission rate (MVTR) of more than 100 g/m$^2$/24 hours, preferably 250-20,000 g/m$^2$/24 hours.
4. The smokable sausage casing according to claim 1, wherein the casing is heat-sealable.
5. The smokable sausage casing according to claim 1, wherein the casing is smokable using natural smoke or liquid smoke.
6. The smokable sausage casing according to claim 1, wherein the finished sausage casing shows a shrinkage of 5-25% in cross direction and of 5-25% in length direction in water at 78° C.
7. A method for the manufacture of cooked meat sausages, scalded-emulsion sausages, cooked or fermented sausages containing fat and smoked ham in smokable sausage casings wherein sausage mix or ham is stuffed into a smokable, biaxially stretch oriented casing and the sausages or ham are smoked and cooked, wherein the casing comprises:
15-85 wt % of a polyamide (i) selected from the group consisting of:
PA6=H—(NH—(CH$_2$)$_5$—CO)$_n$—OH,
PA6/66=H—(NH—(CH$_2$)$_5$—CO)—OH+H—(NH—(CH$_2$)$_6$—HN—CO—(CH$_2$)$_4$—CO)—OH (in random order),
and a combination of polyamides PA6 and PA6/66;
15-85 wt % of a hydrophilic polymer (ii) containing polyamide PA6 blocks and polyethyleneglycol (PEG) blocks or a combination of hydrophilic polymers (ii),
wherein the number-average molar mass of the polyamide PA6 blocks is between 300 and 15,000 and the mass of the polyethyleneglycol (PEG) blocks is between 100 and 6,000, and the ratio of PA6 blocks and PEG blocks in the hydrophilic polymer (ii) is in the range from 1/1 to 3/1,
wherein the casing has a moisture vapour transmission rate (MVTR) of more than 400 g/m$^2$/24 hours when measured using the ASTM E96 BW method, and the thickness of the casing is 15-45 μm, and
wherein the casing comprises one layer.
8. The method according to claim 7, wherein the casing comprises 50-70 wt % of a polyamide (i) or a combination of polyamides (i) and 30-50 w % of a hydrophilic polymer (ii) or a combination of hydrophilic polymers (ii).

9. The method according to claim 7 or 8, wherein the hydrophilic polymer (ii) has a moisture vapour transmission rate (MVTR) of more than 100 g/m$^2$/24 hours, preferably 250-20,000 g/m$^2$/24 hours.

10. The method according to claim 7, wherein the casing is heat-sealable.

11. The method according to claim 7, wherein natural smoke or liquid smoke is used in smoking.

12. The method according to claim 7, wherein the finished sausage casing shows a shrinkage of 5-25% in cross direction and of 5-25% in length direction in water at 78° C.

13. A smokable biaxially stretch oriented sausage casing, comprising:
- 15-85 wt % of a polyamide (i) consisting of PA6/66=H—(NH—(CH$_2$)$_5$—CO)—OH+H—(NH—(CH$_2$)$_6$—HN—CO—(CH$_2$)$_4$—CO)—OH (in random order); and
- 15-85 wt % of a hydrophilic polymer (ii) containing polyamide PA6 blocks and polyethyleneglycol (PEG) blocks or a combination of hydrophilic polymers (ii), wherein
- the number-average molar mass of the polyamide PA6 blocks is between 300 and 15,000,
- the mass of the polyethyleneglycol (PEG) blocks is between 100 and 6,000, and the ratio of PA6 blocks and PEG blocks in the hydrophilic polymer (ii) is in the range from 1/1 to 3/1, and wherein
- the casing has a moisture vapour transmission rate (MVTR) of more than 400 g/m$^2$/24 hours when measured using the ASTM E96 BW method, and the thickness of the casing is 15-45 μm.

* * * * *